United States Patent [19]

Vaske

[11] Patent Number: 5,579,061
[45] Date of Patent: Nov. 26, 1996

[54] TRANSMITTER FOR TRANSMITTING TUNING DATA IN A TELEVISION SIGNAL AND RECEIVER FOR RECEIVING SAME

[75] Inventor: Bernardus H. M. Vaske, Eindhoven, Netherlands

[73] Assignee: U.S. Philips Corporation, New York, N.Y.

[21] Appl. No.: 241,811

[22] Filed: May 12, 1994

[30] Foreign Application Priority Data

May 13, 1993 [BE] Belgium ................................ 09300492

[51] Int. Cl.$^6$ ...................................................... H04N 5/445
[52] U.S. Cl. ........................ 348/731; 348/732; 348/461
[58] Field of Search .................................... 348/473, 563, 348/731, 732, 432, 434, 435, 906, 467, 468, 465, 461, 460, 478, 476, 555, 557, 558, 559, 569, 570, 565, 564, 563, 10; H04N 5/445, 7/087, 7/08

[56] References Cited

U.S. PATENT DOCUMENTS

| | | | |
|---|---|---|---|
| 4,488,179 | 12/1984 | Krüger et al. | 358/171 |
| 4,639,779 | 1/1987 | Greenberg | 358/142 |
| 4,701,794 | 10/1987 | Froling et al. | 358/147 |
| 4,891,703 | 1/1990 | Noundan | 358/142 |
| 4,894,714 | 1/1990 | Christis | 348/10 |
| 4,908,707 | 3/1990 | Kinghorn | 358/147 |
| 4,977,455 | 12/1990 | Young | 358/142 |
| 5,038,211 | 8/1991 | Hallenbeck | 358/142 |
| 5,200,823 | 4/1993 | Yoneda et al. | 358/146 |
| 5,231,493 | 7/1993 | Apitz | 358/146 |
| 5,253,066 | 10/1993 | Vogel | 358/188 |
| 5,432,558 | 7/1995 | Kim | 348/906 |

FOREIGN PATENT DOCUMENTS

| | | |
|---|---|---|
| 0263555 | 4/1988 | European Pat. Off. . |
| 057728342 | 6/1993 | European Pat. Off. ....... H04N 5/782 |

OTHER PUBLICATIONS

"Computer Controlled Teletext", Electronic Components and Applications vol. 6, No. 1, 1984, pp. 15–29.

Primary Examiner—John K. Peng
Assistant Examiner—Nina N. West
Attorney, Agent, or Firm—Debra K. Stephens

[57] ABSTRACT

Transmitter station for transmitting a plurality of television programs, and receiver for receiving the programs.

Transmitter station for transmitting, and receiver for receiving a plurality of television programs via respective transmission channels. A teletext page with tuning data which are representative of the transmission channels used by the transmitter station is transmitted by means of one of the programs, for example a local television program. An installation procedure of downloading the tuning data comprises the search of the local television program. In order to accelerate the procedure, the page header of its teletext pages includes a code (~) indicating that the tuning data are incorporated in said television program.

9 Claims, 6 Drawing Sheets

| P | F(MHz) | NAM | S | PDC |
|---|---|---|---|---|
| 01 | 175.25 | NLD 1 | 0 | 210 |
| 02 | 511.25 | NLD 2 | 0 | 220 |
| 03 | 697.00 | NLD 3 | 0 | 230 |
| .. | | | | |
| 42 | 444.00 | ARD | 0 | |
| 43 | 48.25 | ZDF | 0 | |
| 44 | 501.25 | BBC 1 | 0 | 601 |
| .. | | | | |

FIG. 2A — CRI | F | M/R | TU | SC | C | nnn~Cabletext April 26 10.47:00

FIG. 2B — CRI | F | M/R

FIG.3A

| CRI | F | M/1 | & & | L | | | | | | | NXT | V | % | P | | F | | | NAM | | S | PDC | C |

FIG.3B

| CRI | F | M/R | P | | F | | | NAM | | S | PDC | C | | P | | F | | | NAM | | S | PDC | C |

TRANSMITTER FOR TRANSMITTING TUNING DATA IN A TELEVISION SIGNAL AND RECEIVER FOR RECEIVING SAME

FIELD OF THE INVENTION

The invention relates to a transmitter station for transmitting a plurality of television programs via respective transmission channels, comprising a data generator adapted to transmit tuning data in the television signal of one of the television programs at a given repetition frequency, which tuning data are representative of the transmission channels used by the transmitter station. The invention also relates to a television receiver for receiving television signals from such a transmitter station.

BACKGROUND OF THE INVENTION

Generally, television receivers are tuned to a desired program by means of preset keys, also referred to as program numbers or preset numbers. A tuning memory in the receiver comprises a tuning data for each preset number in the form of the transmitter frequency or channel number, by means of which the receiver is tuned to the corresponding transmission channel. When the receiver is used for the first time, the tuning memory is to be programmed in a procedure referred to as installation procedure. However, also when the installation procedure in a receiver has already been carded out, it may be desirable to modify allocated preset numbers, for example when a new television program is introduced.

Various embodiments of the installation procedure are known. An attractive embodiment is described in European Patent Application EP 0 263 555. This procedure is notably applicable in cable television systems in which the cable network manager takes care of the distribution of television programs. As described in this Patent Application, the cable television transmitter station transmits, simultaneously with at least one of the television programs, a teletext page in which the tuning data of the available programs and corresponding preset numbers are stated. The relevant teletext page has a standardized page number, for example a hexadecimal page number outside the conventional range of 100–899. The installation procedure now comprises the selection of this page and the storage of the tuning data which it incorporates in the tuning memory. Subsequently, all receivable programs can be called by means of the preset number determined by the manager. Generally, this number will satisfy the user's wishes.

The teletext page with tuning data is preferably transmitted with the television signal of a local television program generated by the cable network manager. Practically all cable networks transmit such a program in the form of a cable newspaper, a mosaic image or the like. However, it is not known in advance at which frequency or channel number the local television program is transmitted. As described in said European Patent Application, the television receiver therefore searches all channels in the installation procedure until the program of the predefined teletext page has been found. At each television program which has been found and also transmits teletext (nowadays virtually all programs) a given waiting time is to be observed as to whether the teletext page with tuning data is available. The waiting time is to be relatively long because the page with tuning data may form part of a repetitive cycle comprising a plurality of teletext pages. In practice, a teletext cycle period, hence the repetition time of the page with tuning data, may be more than 30 seconds. Consequently, a problem of the known installation procedure is that the installation may take many minutes. This detracts considerably from the potential user convenience of the known procedure.

OBJECT AND SUMMARY OF THE INVENTION

It is an object of the invention to further improve the installation procedure and, particularly, to accelerate this procedure.

To this end the television transmission system according to the invention is characterized in that the data generator is further adapted to transmit a code in the television signal at a higher repetition frequency than that at which the page with tuning data is transmitted, said code indicating that the tuning data are incorporated in the television signal. It is thereby achieved that already after a relatively short waiting time it can be ascertained whether a television program incorporates or does not incorporate tuning data. Searching for the television program with the tuning data is accelerated considerably. Only for this television program a waiting time for a longer period is to be observed for the page with tuning data.

In a transmitter station in which the tuning data are incorporated in a teletext page, the code is preferably included in the header of the teletext pages of which the page with tuning data forms part. Such an embodiment is very useful because it does not require any extra transmission overhead for transmitting the code, does not further increase the waiting time and can easily be implemented in a consisting teletext service. Moreover, the time of waiting for the code is not dependent on the (a priori unknown) teletext cycle time. If the code is included in the header of all teletext pages in the cycle, and if only one picture line of the television signal is used for teletext (which, as is known, corresponds to 2 teletext pages per second), the maximum time of waiting for the tuning data is 30 seconds for a cycle of 60 pages, 45 seconds for a cycle of 90 pages, etc. However, the code is then transmitted twice per second. When more picture lines are used, the frequency will even be higher. In practice, the code waiting time is therefore only determined by the time required to tune to a channel. Moreover, this embodiment has the advantage that it does not require an additional circuit for the detection of the code, because any conventional teletext decoder receives and stores all headers while waiting for a selected page.

The code is preferably constituted by one of the control codes which are conventionally used in teletext for switching the teletext display mode. Such a code can be incorporated in a space of the text in the header, is invisible to the user and does not impose any further restrictions on the layout of the header.

BRIEF DESCRIPTION OF THE FIGURES

FIGS. 2A, 2B, 3A and 3B show some formats of teletext data packets which are generated by a teletext generator shown in FIG. 1.

DETAILED DESCRIPTION OF PREFERRED EMBODIMENTS OF THE INVENTION

Figures 1, 7:
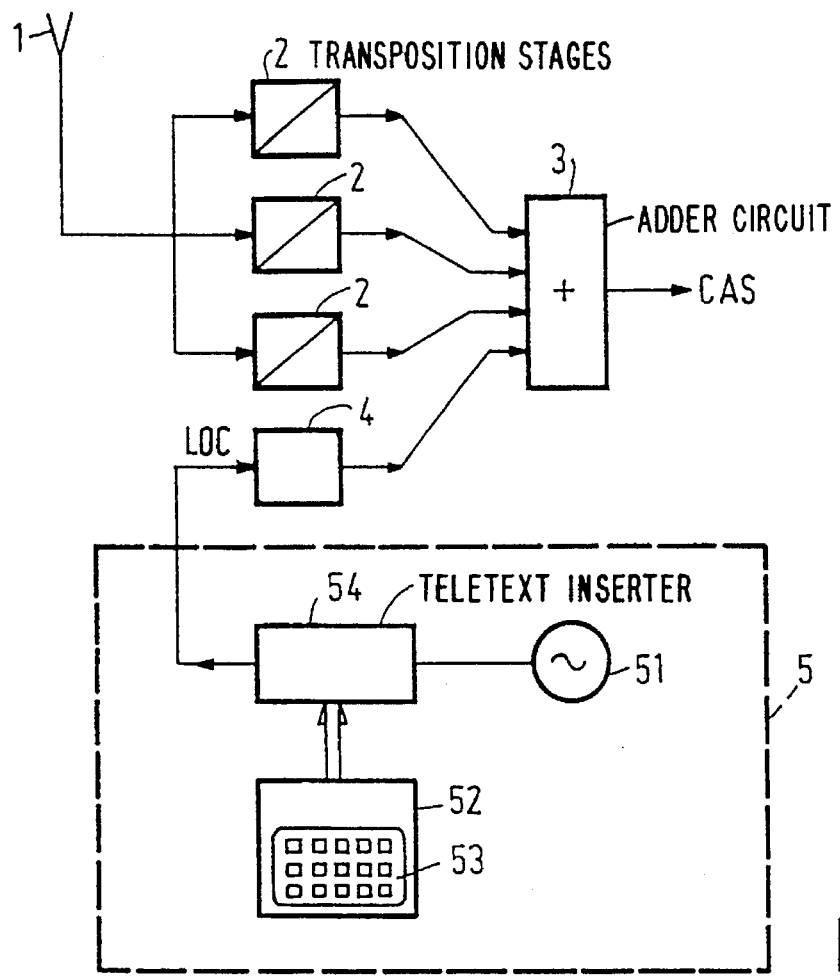
FIG. 1 shows a transmitter station for transmitting a plurality of television programs according to the invention.
FIG. 7 shows a possible division of a tuning memory which is shown in FIG. 5, after execution of the installation program shown in FIG. 6.

FIG. 1 shows a transmitter station according to the invention. The transmitter station has an antenna 1 for receiving television programs. These programs are retransmitted by means of a plurality of parallel-arranged transposition stages 2 via transmission channels which are determined by the station manager. The signals supplied by the transposition stages are added together in an adder circuit 3, so that a central antenna signal CAS occurs at the output thereof, which signal is transmitted to a plurality of television receivers. The retransmitted television programs may or may not comprise a teletext service.

In addition to the retransmitted television programs, the signal CAS also comprises a locally generated television program whose television signal LOC is applied to the adder circuit 3 via a modulator 4. This local TV program is supplied by a signal source 5. This source comprises a video signal source 51 which supplies a baseband video signal and a teletext generator 52 which supplies one or more teletext pages. The teletext generator comprises a keyboard 53 for composing the teletext pages. The pages to be transmitted are accommodated by a teletext inserter 54 on picture lines in the picture flyback of the video signal LOC.

It will hereinafter be assumed that the teletext pages are transmitted in accordance with the known World System Teletext standard. As is shown in FIGS. 2A and 2B a picture line of the television signal comprises a data packet of 45 bytes of 8 bits each. The first 2 bytes having a fixed value 1010 . . . 10 are referred to as "clock run-in" and are denoted by CRI in the Figure. The third byte is a "framing code" F and also has a fixed value. The next 2 bytes comprise a magazine number M and a row number R. The significance of the other 40 bytes depends on the value of the row number R. If the row number has one of the values 1–23, as assumed in FIG. 2B, the 40 bytes constitute a text row of 40 characters for display on a display screen. If the row number has the value 0, as assumed in FIG. 2A, the data packet constitutes a page header of a teletext page. The series of 40 bytes of such a page header starts with two digits T (tens) and U (units) of the page number, a sub-code SC and a plurality of control bits C. The remaining part comprises 24 character positions with a page header text and 8 character positions for display of the actual time. In principle, the header text of all pages is equal for all teletext pages. However, it is possible (and common practice) to incorporate the page number in the form of displayable characters in the header text once again. In that case the page headers differ from each other in the page number.

The transmission of a teletext page starts with, and implies, the page header of this page and subsequently comprises the relevant text rows. The page number is constituted by the magazine number M, tens T and units U. It is a 3-digit number and is generally within the range 100–899 in order that the user can select it by means of a decimal keyboard. A series of teletext pages is transmitted in a repetitive cycle. By way of example, it will hereinafter be assumed that a cycle of 120 teletext pages is transmitted via two picture lines of the television signal via the local television program. The duration of the cycle is then 30 seconds.

As is shown by way of example in FIG. 2A, the page header of all teletext pages transmitted with the local television program comprises the character series "nnn~Cabletext . . . ". Herein, nnn represents the page number and ~ represents the code indicating that the television program comprises the page with tuning data. The code ~ may be constituted by a control code which is shown as a space when it is displayed on the display screen. A number of these control codes is used in the World System Teletext standard. They are intended to control a number of available display modi of the subsequent characters. For example, there are control codes for controlling the colour of the subsequent characters, or for switching over from alphanumerical to graphic display. Other examples of control codes are "flash" causing the subsequent characters to flash, or "conceal" suppressing the display of the subsequent characters. Some control codes occur in pairs. They have a complementary version for eliminating the relevant display mode. For example, "flash" has the complementary control code "steady", and "conceal" has the complementary version "reveal".

Some display modi, inter alia, "flash" and "conceal", are never used in practice in teletext page headers. The relevant control codes and their complementary versions therefore do not occur in the page header of a normal teletext transmission. Consequently, they are very suitable to indicate that a teletext cycle comprises the teletext page with tuning data. Notably, said complementary control codes are suitable because they do not have any effect on themselves as regards the display mode. It will hereinafter be assumed that the code ~ shown in FIG. 2A is constituted by the control code "steady".

FIGS. 3A and 3B shows the format of the text rows constituted by the page with tuning data. More particularly, FIG. 3A shows the format of the first text row and FIG. 3B shows the format of the other text rows. The first 20 characters of the first text row (see FIG. 3A) comprise system information, inter alia, two characters && so as to indicate that the page with tuning data is concerned, a language code L, the page number NXT of possible subsequent pages with further tuning data, a version number V and a character % to indicate that it is followed by the tuning data of a television program. Non-specified character positions are reserved for future uses. The second part of the first text row (see FIG. 3A) and the first and second parts of the other text rows (see FIG. 3B) comprise tuning data of the television programs which are transmitted by the transmitter station. These tuning data are successively: a 2-digit preset number P, a 5-digit tuning frequency F, a transmitter name NAM of 7 characters, a system code S to indicate in accordance with which television standard the relevant program is being transmitted (0=PAL B/G, 1=SECAM L, 2=PAL M, 3=NTSC, etc.), the page number PDC of a teletext page with which video recorders can be programmed (PDC stands for Program Delivery Control) and a continuation code c which, by way of the character %, indicates that more tuning data follow or, by way of the character !, indicates that the tuning data on the page are ended.

Figure 4:
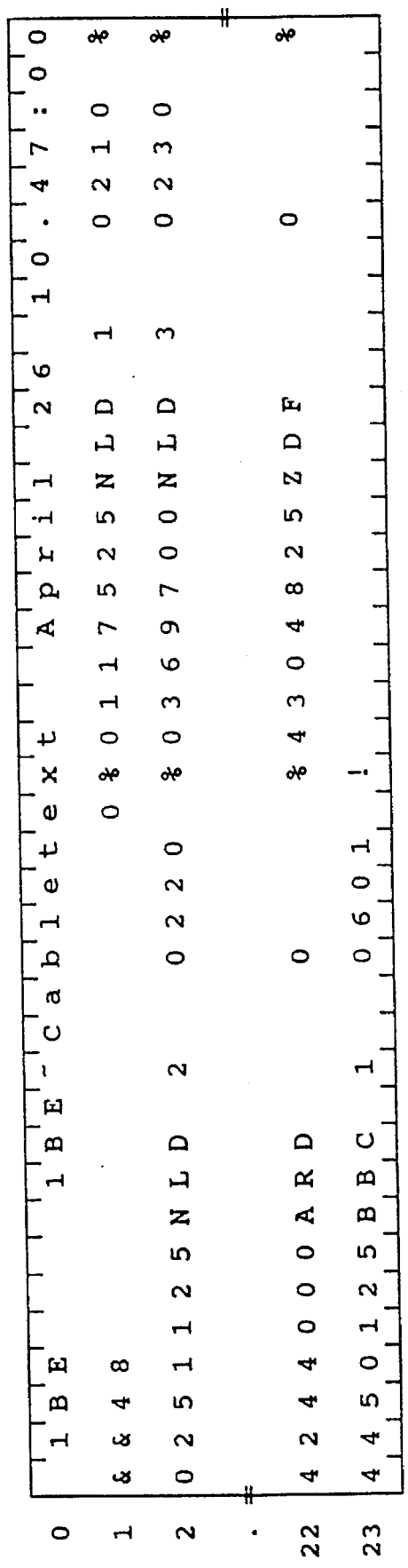
FIG. 4 shows an embodiment of a teletext page with tuning data.

Since the page with tuning data comprises various characters having a special significance and is not intended for selection by the user, a number outside the conventional range of 100–899 has been chosen for the page number, for example the hexadecimal number 1BE. An example of the page with tuning data is shown in FIG. 4. As has been attempted to show in this Figure, the page comprises the tuning data of 44 receivable television programs. The righthand part of text row 1 comprises the tuning data of a television program which is coupled to preset number 01. This program is transmitted at 175.25 MHz, is named NLD 1, is transmitted in accordance with the PAL B/G standard and comprises the PDC data on teletext page 210. A second television program, coupled to preset number 02, is transmitted at 511.25 MHz, is named NLD 2, is also transmitted in accordance with the PAL B/G standard and comprises the PDC data on teletext page 220.

Several variations of the teletext page shown in FIG. 4 are possible. For example, the preset numbers need not necessarily be incorporated in the page, because they can also be derived from the row number, if necessary. If incorporated in the page, the preset numbers need not necessarily be incorporated in their numerical sequence. The division shown in FIG. 4 has, however the advantage of the possibility of detecting inconsistencies due to transmission errors. If such a situation occurs, a waiting time can be observed for a new transmission of the page. Moreover, a channel number may be used instead of the tuning frequency.

Figure 5:
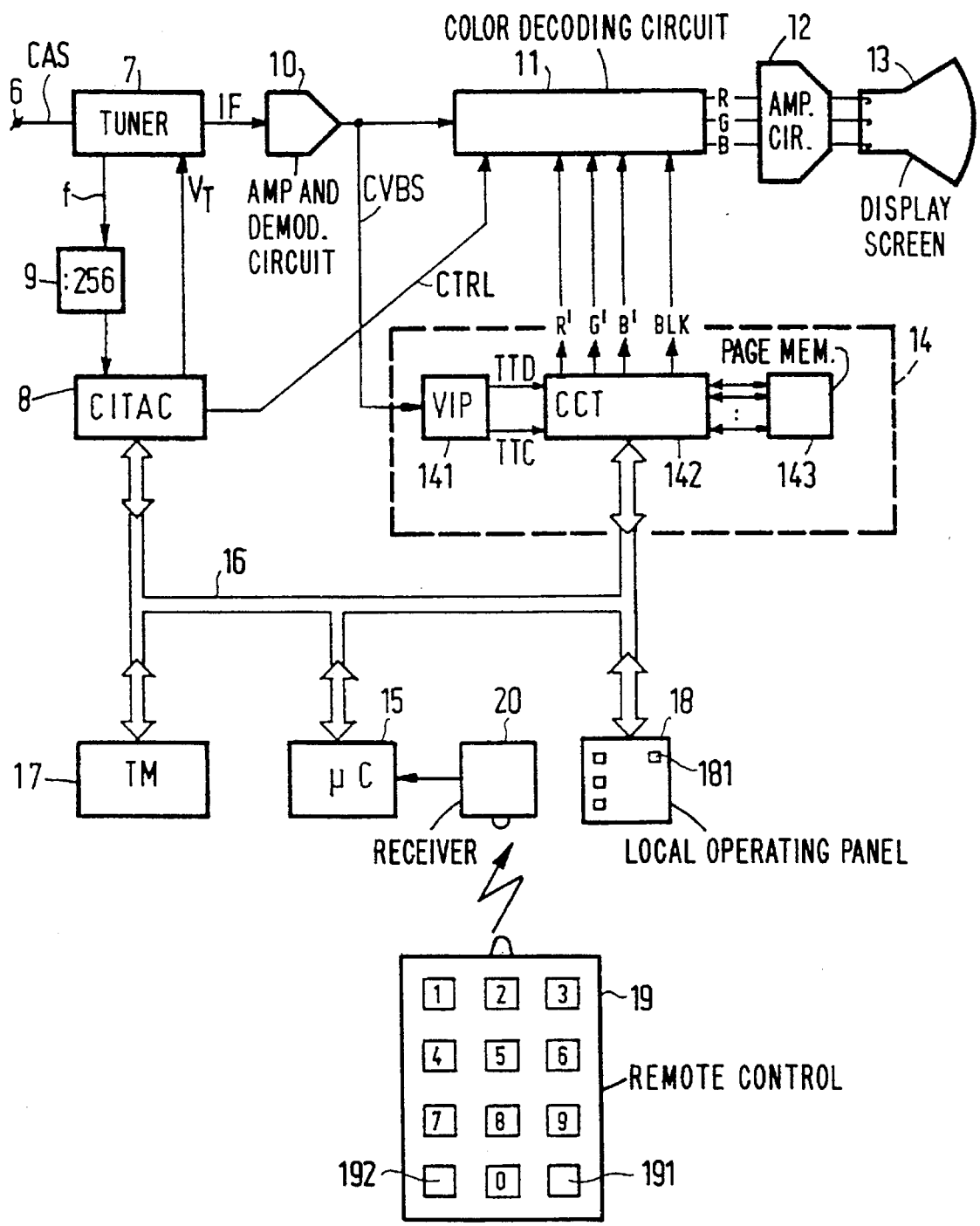
FIG. 5 shows diagrammatically the general structure of a television receiver according to the invention.

FIG. 5 shows diagrammatically the general structure of a color television receiver (or the receiver section of a video recorder) in accordance with the invention. The receiver has an antenna input 6 which receives the central antenna signal CAS from the transmitter station shown in FIG. 1. The received signal is applied to a tuner 7. This tuner receives a tuning voltage $V_T$ from an interface circuit 8. The Philips IC SAB 3035 known under the name of CITAC (Computer Interface for Tuning and Analog Control) may be chosen as an interface circuit. The tuner 7 supplies an oscillator signal of the frequency f and, after division by 256 in a frequency divider 9, it supplies this signal to the CITAC 8. Thus, the tuner 7, divider 9 and CITAC 8 constitute a frequency synthesis circuit. If a number representative of a tuning frequency or channel number is applied to the CITAC, the tuner autonomously tunes to this frequency or channel number.

The tuner 7 further supplies an intermediate-frequency signal IF. The last-mentioned signal is applied to an intermediate-frequency amplifier and demodulation circuit 10 which supplies a baseband video signal CVBS. The Philips IC TDA 2540 may be chosen for this circuit 10. The video signal CVBS is applied to a color decoding circuit 11 which supplies the three primary colour signals R, G, B which in their turn are applied via an amplifier circuit 12 to a display green 13 for display of the received program. In the color decoding circuit 11, color saturation, contrast and brightness are influenced by means of appropriate control signals CTRL which are also supplied by the CITAC. Moreover, it receives an additional set of elementary color signals R', G' and B' and a blanking signal BLK by which the primary colour signals R, G and B can be suppressed completely or partly. A Philips IC of the TDA 356X family may be chosen for this circuit 11.

The video signal CVBS is also applied to a teletext decoder 14. This decoder comprises a video input processor 141 which receives the video signal CVBS, separates the teletext data packets therefrom and applies these packets through a data line TTD to a circuit 142 which will be referred to as Computer Controlled Teletext decoder (abbreviated CCT decoder). The CCT decoder also receives a clock signal from the video input processor 141 via a clock line TTC. It is further coupled to a memory 143 in which one or more teletext pages can be stored and which is therefore referred to as page memory. The CCT decoder supplies the three previously mentioned elementary colour signals R', G' and B' and the blanking signal BLK. The CCT decoder is also suitable for displaying locally generated On-Screen-Display information. The video input processor 141 may be constituted by the Philips IC SAA 5230, the CCT decoder 142 may be the Philips IC SAA 5240 and the page memory 143 may be an 8 kbyte RAM. For an extensive description of structure and operation of the teletext decoder 14, reference is made to "Computer Controlled Teletext", Electronic Components and Applications, vol. 6, no. 1, 1984, pp. 15–29.

The receiver further comprises a control circuit 15 in the form of a microcomputer. A microcomputer of the MAB 84xx family of Philips may be used for this purpose. The microcomputer is coupled via a bus system 16 to the teletext decoder 14, the CITAC 8, a non-volatile memory 17 and a local operating panel 18. The nonvolatile memory 17, which will further be referred to as tuning memory TM, is used for storing, inter alia the tuning data of receivable television programs. The user can program the tuning memory at will by means of the local operating panel 18, i.e. he can arbitrarily store the tuning data of desired television programs under a preset number. This further known method of programming the tuning memory will be referred to as "manual programming". The local operating panel further comprises an installation key 181 for automatic programming.

A hand-held remote control unit 19 is used for the daily operation of the receiver. This unit transmits infrared operating signals to a receiver 20 which is connected to an input of microcomputer 15. The remote control unit 19 comprises a plurality of keys 0 to 9 and the further customary keys for controlling picture and sound, switching on a teletext mode and the like.

The operation of the television receiver is further determined by a control program which is stored in the memory of microcomputer 15. In a normal operating mode, the receiver is tuned by generating a preset number by means of a key, or a combination of keys. The tuning frequency of a television program coupled thereto is stored in the tuning memory 17 for each preset number. The relevant tuning frequency is read by the microcomputer 15 and applied to the CITAC 8.

Figure 6:
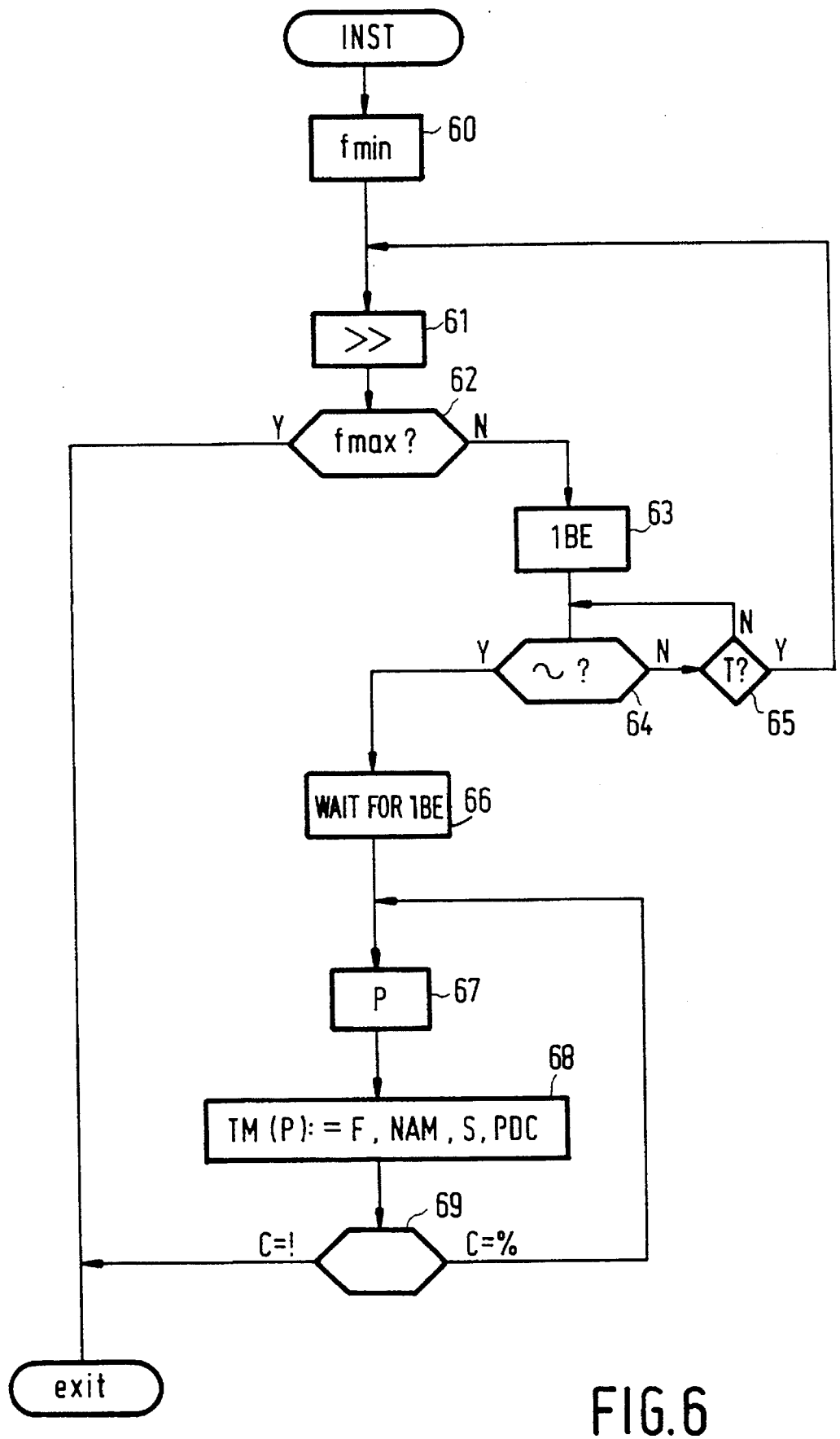
FIG. 6 shows the flow chart of an installation program which is performed by a microcomputer shown in FIG. 5.

If the installation key 181 is depressed, the microcomputer performs an installation program INST which is shown in FIG. 6. In a step 60 of this program a lowest tuning frequency $f_{min}$ is applied to the CITAC. Subsequently, in a step 61, a search procedure is started in which the tuning frequency is step-wise increased until a television signal is received. When a maximum frequency $f_{max}$ is exceeded (step 62), the installation program is ended.

While the receiver is tuned to a television program found, the microcomputer supplies the page number 1BE to the teletext decoder in a step 63. The teletext decoder now starts the acquisition of this page. However, it is not known in advance whether the received television program transmits teletext and, if so, whether page 1BE is present therein. While a waiting time of the selected teletext page is observed, the teletext decoder writes the page headers of all received pages into the page memory 143 (see FIG. 5) in further known manner. If the receiver is tuned to the local television program (two picture lines with teletext), this is effected by means of a frequency of 4 headers per second. The header text "nnn–Cabletext . . . " (see FIG. 2A) is thus written into the memory 4 times per second. Only the page numbers then change all the time. The rest of the header text is continuously overwritten by means of identical characters and is thus unchanged. Notably the "steady" code ~ is thus received 4 times per second from the start of the acquisition and written into the page memory.

In a step 64, the microcomputer reads the header text in the page memory and ascertains whether the "steady" code ~ occurs therein. If this is not the case, the microcomputer rereads the header text during a predetermined time T (step 65). The time T need only be ½ second, because two page headers per second are received, even when one picture line is used for teletext. If the receiver is tuned to a television program transmitting teletext, it is thus known after ½ second whether this is the local television program showing the page with tuning data. If this is not the case, the installation program returns to step 61 so as to search a further television program. This program loop is terminated as soon as in step 62 it has been ascertained that the highest tuning frequency $f_{max}$ is reached without the searched television program having been found. In that case, for example, the user can be informed that he should resort to "manual programming".

If the "steady" code ~ has been found in step 64, the teletext decoder waits in a step 66 for the reception of teletext page 1BE with the tuning data. The entire page is then stored in the page memory. The microcomputer subsequently reads a preset number P (step 67) in the page memory and addresses a corresponding location TM(P) of the tuning memory. In a step 68 the microcomputer subsequently reads the P-associated tuning frequency F, the transmitter name NAM, the system code S and the page number PDC and stores them at said memory location TM(P). Finally, the continuation code c is read in a step 69. If this code is constituted by the character %, the microcomputer will return to step 67 for processing a subsequent preset number. If the continuation code is constituted by the character !, all preset numbers will have been processed and the installation program will be ended. If not all preset numbers in page 1BE are transmitted, the microcomputer can read the page number NXT (see FIG. 3A) of a subsequent page in the first page header. This page is then selected (not shown in FIG. 6), whereafter the steps 67–69 for this subsequent page are repeated.

It is to be noted that in the step (34, in which the occurrence of the code ~ (in this example "steady") is ascertained, it is also possible to ascertain whether this code is preceded by its dual version ("flash"). In that case the local television program is not received but there is apparently a television program with a teletext transmission in which actually "flash" display in the header text is envisaged.

After termination of the installation procedure, the tuning memory has a content as is shown in FIG. 7. The memory comprises a plurality of memory locations each of which stores a tuning frequency F, transmitter name NAM, system code S and PDC page number. It is useful to present an On-Screen-Display survey of at least the preset numbers and the associated transmitter names on the display screen at the end of the installation procedure, or at the user's request via an OSD key (191 in FIG. 5).

As already described hereinbefore with reference to FIG. 5, the memory location of the tuning memory 17 corresponding to the preset number on the remote control unit is addressed when this preset number is activated in the normal TV operating mode. The microcomputer 15 now reads the tuning frequency F stored in this memory location and applies it to CITAC 8 so that the receiver is tuned to the relevant program. Moreover, the corresponding transmitter name NAM is read and applied to the teletext decoder 14 for On-Screen Display for several seconds. Since the transmitter names are determined by the manager of the transmitter station in accordance with local practice, the cumbersome manual programming of transmitter names as is usual in some known television receivers can be dispensed with. Manual reprogramming of transmitter names in accordance with personal preference remains possible.

As far as television programs are transmitted by the transmitter station in accordance with a standard different from that used locally (for example, NTSC instead of PAL) and as far as the receiver is a multistandard receiver, the microcomputer also reads the corresponding system code S for each preset number and switches the receiver to the standard concerned.

If the receiver is adapted for automatic display or recording preprogrammed television programs by means of PDC (Program Delivery Control) whose programming data are incorporated in a given teletext page, this PDC page can be directly accessed by means of a PDC key (192 in FIG. 5) without the user having to know the page number to be selected for this purpose.

Finally it is to be noted that nowadays many television receivers are provided with an extensive operating system menu in various languages. The user does not need to choose the language himself in the receiver described hereinbefore. Since the transmitter station transmits the language code of the locally used language (L in FIG. 3A), the receiver can automatically be adjusted to this language.

I claim:

1. A transmitter for transmitting a plurality of television signals via respective transmission channels, comprising:

a data generator for transmitting tuning data in one of said television signals at a first predetermined repetition frequency, said tuning data representative of said transmission channels used by said transmitter; and means for transmitting a data signal in said one television signal which includes said tuning data, at a second predetermined repetition frequency higher than said first predetermined repetition frequency.

2. The transmitter of claim 1, wherein said data generator generates teletext pages, each teletext page having a page header, wherein one of said teletext pages includes said tuning data and wherein said data signal is included in each of said page headers.

3. The transmitter of claim 2, wherein the data signal is included in a character position of said page header as a "space" and is constituted by a control code for switching a teletext display mode.

4. The transmitter of claim 2, wherein said data signal is included in said page header of the plurality of teletext pages not including the tuning data.

5. The transmitter of claim 1, wherein said data signal indicates that the tuning data are included in said one television signal.

6. A receiver for receiving television signals from a transmitter via a plurality of transmission channels, comprising:

a tuner for tuning to said transmission channels;

a decoder for receiving and storing data included in said television signals;

a control circuit coupled to said tuner and decoder detecting a data signal which indicates that tuning data is included in a television signal and for receiving tuning data from the television signal, said data signal in the television signal including tuning data being transmitted at a higher repetition frequency than tuning data in particular television signals; and a tuning memory coupled to said control circuit for storing received tuning data.

7. The receiver of claim 6, wherein each said television signal includes a plurality of teletext pages, each teletext page having a page header, and one of said teletext pages includes said tuning data and wherein said control circuit selects a predetermined teletext page and, while awaiting reception, detects whether said data signal is included in said page header.

8. The receiver of claim 7, wherein said control circuit tunes to a further transmission channel when said data signal is not detected during a predetermined period of time.

9. The receiver of claim 6, wherein said control circuit tunes to a further transmission channel when said data signal is not detected during a predetermined period of time.

\* \* \* \* \*